Nov. 11, 1924.
L. M. ASPINWALL
1,515,138
CONTROL SYSTEM
Filed Feb. 3, 1923
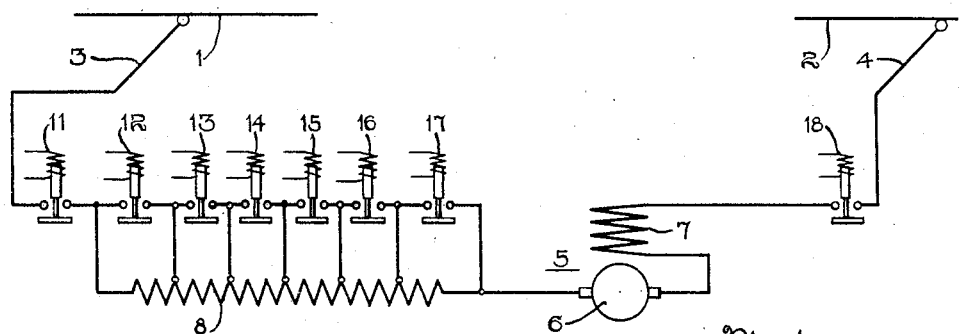
Fig. 1.
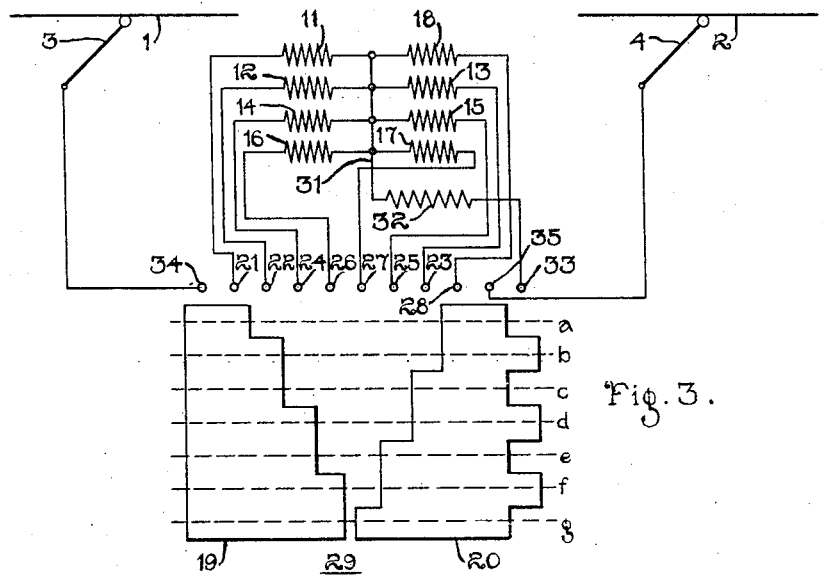
Fig. 3.
| Steps | Switches | | | | | | | | Bal. Res. |
|---|---|---|---|---|---|---|---|---|---|
| | 11 | 18 | 12 | 13 | 14 | 15 | 16 | 17 | |
| a | o | o | | | | | | | |
| b | o | o | o | | | | | | o |
| c | o | o | o | o | | | | | |
| d | o | o | o | o | o | | | | o |
| e | o | o | o | o | o | o | | | |
| f | o | o | o | o | o | o | o | | o |
| g | o | o | o | o | o | o | o | o | |
Fig. 2
WITNESSES:
C. N. Cochran
C. W. Shaw.
INVENTOR
Louis M. Aspinwall.
BY
Wesley G. Carr
ATTORNEY Patented Nov. 11, 1924.

1,515,138

UNITED STATES PATENT OFFICE.

LOUIS M. ASPINWALL, OF PITTSBURGH, PENNSYLVANIA, ASSIGNOR TO WESTINGHOUSE ELECTRIC & MANUFACTURING COMPANY, A CORPORATION OF PENNSYLVANIA.

CONTROL SYSTEM.

Application filed February 3, 1923. Serial No. 616,764.

*To all whom it may concern:*

Be it known that I, LOUIS M. ASPINWALL, a citizen of the United States, and a resident of Pittsburgh, in the county of Allegheny and State of Pennsylvania, have invented a new and useful Improvement in Control Systems, of which the following is a specification.

My invention relates to control systems and it has special relation to control systems in which electromagnetic switches are operated by line voltage.

It has been the practice in the past, in this class of control systems, to connect a resistor of comparatively high resistance across the line circuit and to shunt the magnet windings of certain switches across different sections of the resistor in order to avoid using coils wound for full line potential. This arrangement necessitates the use of a number of resistance tubes and is the cause of a constant loss of energy through the control resistors whenever the coils are energized.

An object of my invention is to provide a system in which the magnet coils are specially grouped about a central balance wire in connection with a single resistance tube or other resistor.

Another object is to reduce the number of resistance tubes required, and the resultant energy loss, to a minimum.

These and other objects and applications may be obtained by means of the apparatus hereinafter described and claimed, and illustrated in its preferred form in the accompanying drawing, Fig. 1 of which is a diagrammatic view of the main circuits of a system of control embodying my invention, Fig. 2 is a sequence chart of well known form for indicating the sequence of operation of the various switches that are illustrated in Fig. 1, and Fig. 3 is a diagrammatic view of my auxiliary governing system for manipulating the various switches in accordance with the sequence chart of Fig. 2.

Referring to Fig. 1 of the drawing, the system shown comprises a plurality of suitable supply conductors 1 and 2. A plurality of current-collecting devices 3 and 4, such as trolleys or the like, are normally in engagement with the supply conductors 1 and 2, respectively.

A motor 5, having a commutator-type armature 6 and a series field winding 7, may be connected in series relation with an accelerating resistor 8, the sections of which are respectively adapted to be short-circuited by switches 12 to 17, inclusive. A plurality of line switches 11 and 18 are interposed in the opposite sides of the main circuit.

Referring to Fig. 3 of the drawing, the auxiliary governing system shown comprises a master controller 29 having a plurality of contact segments 19 and 20 and adapted to occupy a plurality of operative positions *a* to *g* inclusive.

One terminal of each of the operating coils of switches 11 to 18, inclusive, is connected to one of the control fingers 21 to 28, inclusive, of master controller 29. The other terminals of the operating coils of switches 11 to 18, inclusive, are connected to a common conductor or balance wire 31. Each of the operating coils is wound to operate on approximately one half line voltage.

A single resistor 32, having a resistance value equal to that of each individual operating coil, has one end connected to the common conductor 31. The other terminal of resistor 32 is connected to control finger 33 of master controller 29.

Supply conductors 1 and 2 are connected, respectively, through trolleys 3 and 4 to control fingers 34 and 35 to engage contact segments 19 and 20 of the master controller 29, under operating conditions.

With the desired sequence of operation as indicated in Fig. 2, it will be noted that, when the master controller 29 is moved to its initial position *a*, contact segment 19 is moved into engagement with control fingers 34 and 21, and contact segment 20 is moved into engagement with control fingers 28 and 35. The operating coils of line switches 11 and 18 are thus energized by being placed in series relation across the line.

For the second operating step, master controller 29 is moved to position *b* to close switch 12 in addition to switches 11 and 18. If it were attempted to close the switch 12 by simply connecting one terminal of its operating coil through control finger 22 to contact segment 19, a condition would arise whereby the operating coils would be connected in parallel relation to each other and in series relation with switch 18. The operating coils of switches 11 and 12, therefore, would receive only ⅓ of line voltage and the operating coil of switch 18 would receive ⅔ of line voltage. This would be a very undesirable operating condition, as it would greatly decrease the operating range of the equipment, and a drop in line voltage might result in failure of the switches to close.

To overcome this condition, resistor 32 is connected from the balance wire 31, through control finger 33 to contact segment 20, thus keeping the circuit balanced and the potential on all coils the same, since resistor 32 is thus connected in parallel relation to the operating coil of switch 18.

For the third step, master controller 29 is moved to the position c to close switches 12 and 13. The contour of contact segment 20 is such that resistor 32 is cut out of circuit, and the operating coil of switch 13 is substituted therefor. Balanced voltage conditions upon the active operating coils are thus maintained.

For the fourth step, the master controller 29 is moved to position d to close switch 14, and the resistor 32 is again connected on the leg of the circuit opposite to the operating coil of switch 14.

In like manner, the resistor 32 is thrown in or out, as required, to keep the auxiliary circuit resistance values balanced throughout all the operating positions of the master controller 29.

It is thus seen that, in my invention, I have obviated the necessity of employing a resistor of comparatively high resistance value connected across the line, with a correspondingly large loss of energy whenever the controller is in any of its operative positions. A control system of one of the types now in use requires ten control resistor tubes, and, by actual measurement, 475 watts is wasted continuously in resistance when the controller is in any operative position. This system, if used in conjunction with my invention would require only one tube and no energy would be wasted when the controller was on the last notch.

I do not wish to be restricted to the specific circuit connections or arrangements of parts herein set forth, as various modifications thereof may be made within the spirit and scope of my invention. I desire, therefore, that only such limitations shall be imposed thereon as are indicated in the appended claims.

I claim as my invention:

1. A control system comprising a plurality of switches, a plurality of coils cooperating therewith, a resistor, and a single controller for connecting said coils in parallel relation to one another or to said resistor.

2. A control system comprising a plurality of switches, a plurality of coils cooperating therewith, a resistor, and a single controller for connecting together one terminal of each of said coils and one terminal of said resistor and for connecting said coils in parallel relation to one another or to said resistor.

3. A control sytsem comprising a plurality of switches, a plurality of coils cooperating therewith, a resistor, and a single controller for successively energizing said coils and for connecting said resistor in parallel relation to said coils when an uneven number of said coils are energized.

4. A control system comprising a plurality of switches, a plurality of coils cooperating therewith, a resistor, a master controller, and means, comprising said master controller, for connecting said coils in parallel relation to one another, or to said resistor, upon actuation of said master controller to its successive postions.

5. A control system comprising a plurality of switches, a plurality of coils cooperating therewith, a resistor, and a single controller for connecting said resistor in parallel relation to one or more of said coils when an uneven number of said coils are energized and for disconnecting said resistor and connecting a plurality of said coils in parallel relation to one another when an uneven number of said coils are energized.

6. A control system comprising a plurality of switches, a plurality of coils cooperating therewith, a controller, means, operative upon actuation of said controller to its initial position, for connecting a plurality of said coils in series relation, means, operative upon further actuation of said controller, for connecting a plurality of said coils in parallel relation to each other and another of said coils in parallel relation to said resistor, and means, operative upon still further actuation of said controller, for disconnecting said resistor and substituting therefor another of said first-mentioned coils.

7. A control system comprising a plurality of switches severally having actuating coils, a resistor, and a single controller for initially connecting certain of said coils in series relation and for concurrently connecting said resistor across one of said coils when an additional coil is connected across another of said coils, to equalize the potential impressed upon the various connected coils.

8. A control system comprising a plurality of switches severally having actuating coils, a resistor, and a single controller having a plurality of independent contact devices for initially connecting certain of said coils in series relation, one of said segments being adapted to subsequently connect an additional coil across one of said coils and another segment being adapted to concurrently connect said resistor across another of said coils, to equalize the potential impressed upon the various connected coils.

In testimony whereof, I have hereunto subscribed my name this 25th day of January, 1923.

LOUIS M. ASPINWALL.